Figure 2:
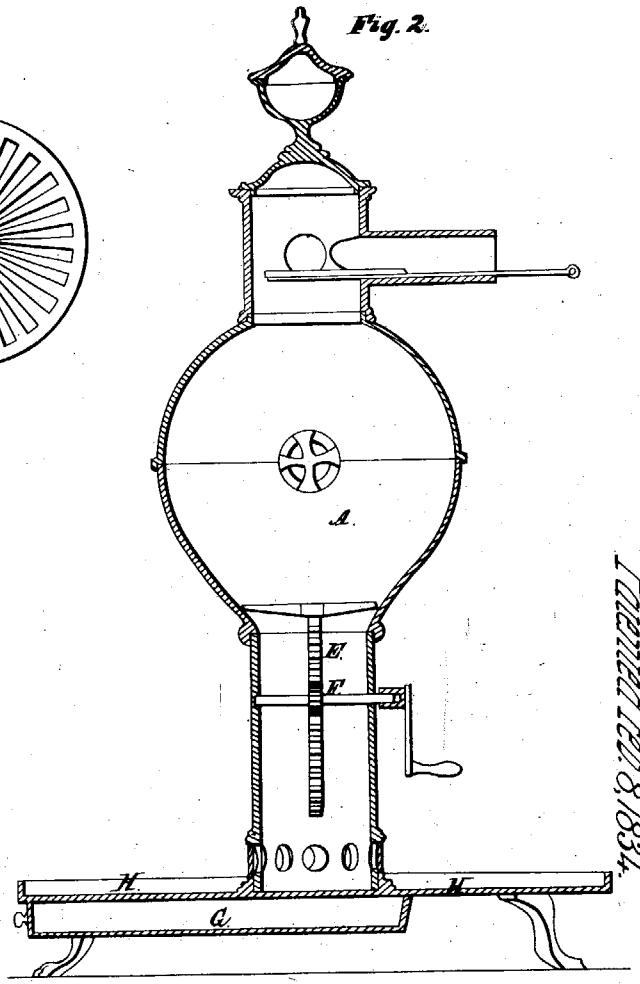
Figure 3:
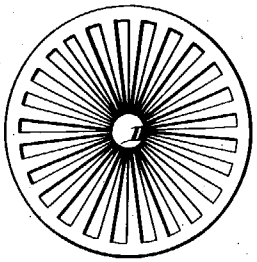
Figure 1:
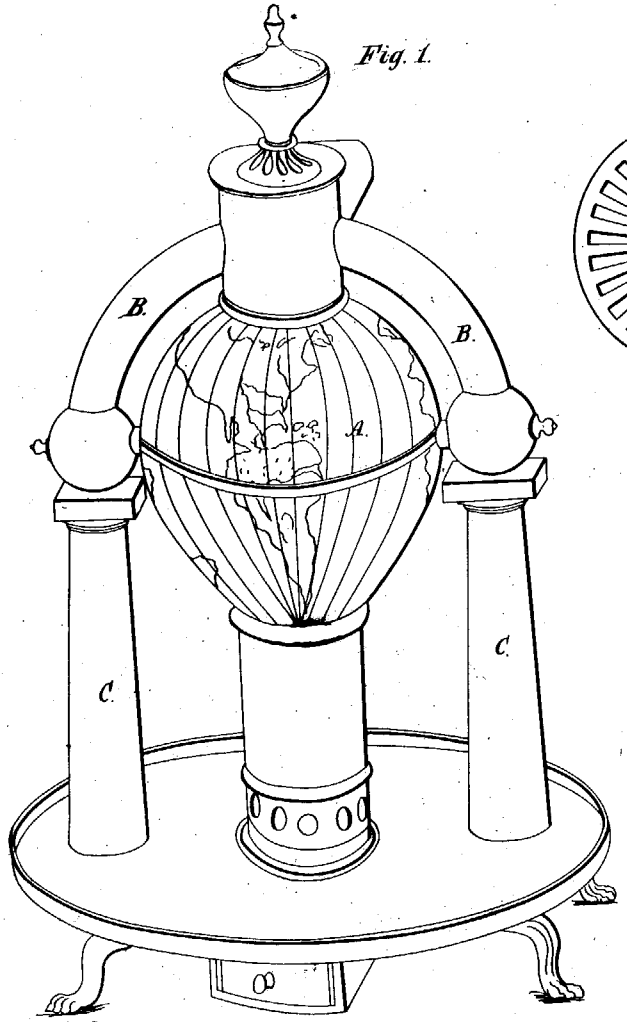
Figure 6:
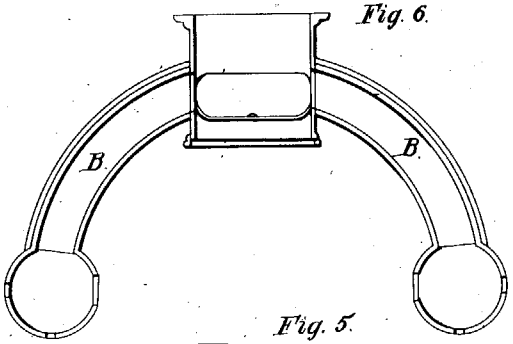
Figure 5:
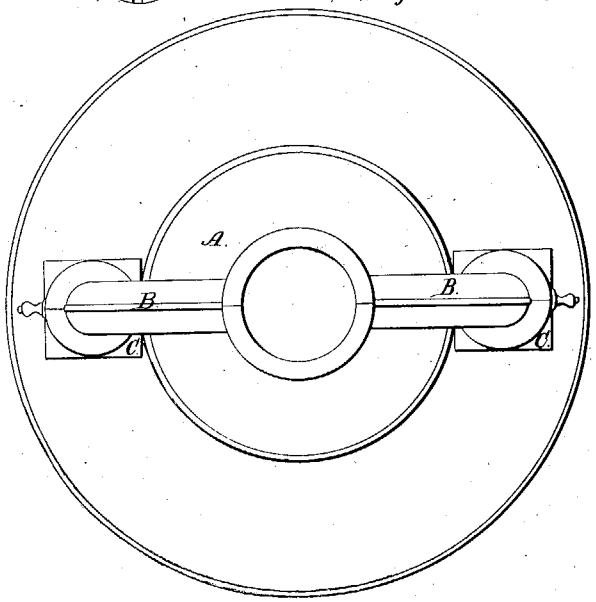
Figure 7:
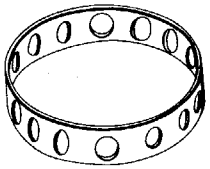
Figure 4:
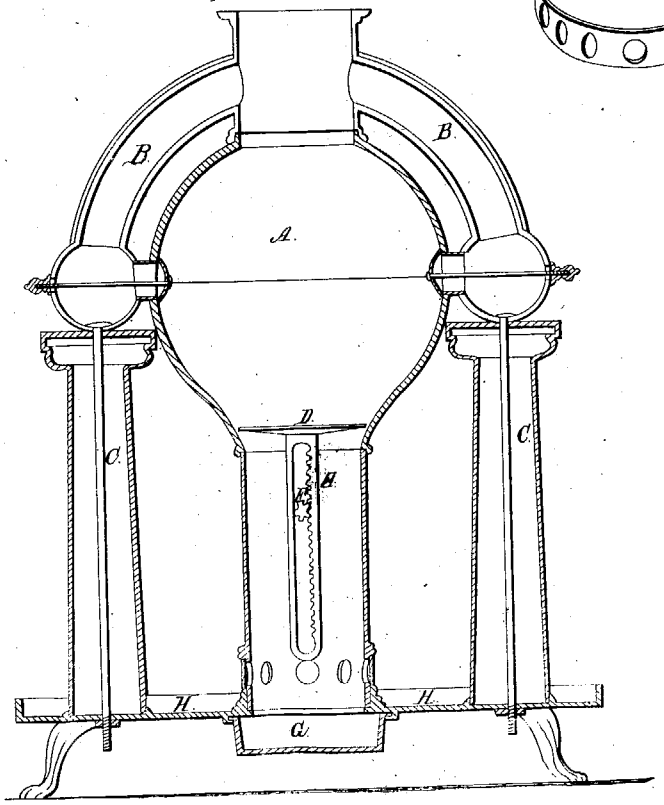

8006X

Sheet 1-2 Sheets.

W. Hunt.

Heating Stove.

Patented Feb. 8, 1834.

8006X

W. Hunt.

Sheet 2-2 Sheets.

Heating Stove.

Patented Feb. 8, 1834.

Feb 8 1834 8006x 77

Walter Hunt a Citizen of the United States

[illegible] Improvement in the Construction & Manufacturing of Cast

[illegible] Iron Stoves for burning Anthracite Coal & other fuel which is denominated the Radiator or Globe Stove Date of Patent Febry 8 1834

Certificate of Attorney Genl Feby 8 1834

The Schedule referred to in these Letters Patent and making part of the same containing a description in the words of the said Walter Hunt himself of his improvement in the construction and Manufacturing of Cast Iron Stoves for burning Anthracite coal and other fuel which is denominated the Radiator or Globe Stove.

To all to whom these Presents shall come

Be it known that I Walter Hunt of the City County and State of New York have invented a new and useful improvement in the arrangement and construction of a stove designed for burning coal or other fuel but more particularly adapted to the use of anthracite coal for the common purposes of heating rooms &c which I distinguish by the name of the Radiator or Globe Stove and that the following is a full and exact description of the construction and operation of said Radiator or Globe Stove as invented or improved by me —

Upon a cast Iron circular hearth of about thirty inches in diameter stands two cast or sheet Iron hollow columns about three inches in average diameter, twenty inches in height and about the same distance apart. Upon these columns stands a semicircular arch of cast Iron made hollow and round of about three inches in diameter. The feet of said arch which rest upon the caps of said columns are formed into hollow globes about five inches in diameter which are cast in halves united with each half of the arch and are joined perpendicularly through the centre with the arch — The joint being covered by a fillet about three eighths of an inch
wide cast either upon the edge of one half of the arch
which laps its width upon the edge of the other half. The
centre or crown of said arch is formed into a hollow cyl-
inder about eight inches in height and five in diameter
open at top and bottom with a pipe about three or four
inches in length and the same in diameter projecting at
right angles from the centre of said cylinder in a hori-
zontal position and forms the tube which receives the first
joint of [illegible] sheet Iron pipe. Upon the outer and inner
sides of said small Globes which forms the feet of said
arch as before described are flanched openings about three
and a half inches in diameter. Upon the outer flanches
are fitted ornamental cylindrical caps, which cover said
outer openings and binds the feet of said arch together.
A ring forming a cap moulding is fitted upon the top
of said crown cylinder which performs the office of hoop
to bind the arch and crown cylinder together and forms
also a base to support the water urn which stands cen-
trally upon said crown cylinder covering with its
base the upper head and opening of the same. The
urn is of cast Iron about eight inches in height of ordin-
ary form and its vase about one quart capacity. The
upper section which forms a cover to be removed at
pleasure. The principle use of said urn is to con-
tain water for evaporation. It also assists in giving
a symmetrical finish to the most elevated posi-
tion of the stove. I would here recapitulate that the arch
with its various parts is composed of only two nearly similar pieces
exclusive of the rings and caps before mentioned which
serve to bind said arch cylinder Globes &c. together. It is
further secured by two or more rivets or screws through
the arch and the joint set in fire cement. Through

8006X each of said hollow columns passes a rod or bolt of about
half inch round iron having a firm suitable head within
the globular feet of said arch which being placed regular
upon said columns the bottom end of said rods pass down
through holes in the hearth made centrally under the col-
umns, and having screws cut upon their ends upon which
suitable nuts are placed which on being sufficiently turn-
ed the arch columns and hearth are all firmly bound to-
gether in their proper positions centrally under this arch
is suspended a hollow cast Iron globe or sphere
made in two hemispheres, and joined horizontally near
the centre with flanched openings at the top bottom and
sides, or poles. The said openings are the same diameter
and directly opposite of those on the inner sides of the small
globes as before described. Through which openings Cast
Iron thimbles or short tubes as large as the aforesaid openings
will admit with their inner ends flanched and grated
are passed from the globe into the feet of said arch where
they are secured by bolts having their heads in the large
globe passing horizontally and centrally through said tubes
and cylindrical caps (as before mentioned) having screws
cut upon their ends upon which ornamental nuts are placed,
which on being properly screwed up, the said small grates
designed to keep the fuel from falling into the said
small globes are brought firmly to their places at the same
time binding the said thimbles and cylindrical caps
firmly upon said small globes securing them and
the bottom section of said arch from the possibility
of spreading at the same time suspending the second
or large globe in a proper position by means of the
above mentioned thimbles which are also flues through
which a portion of the draught passes to the small
globes through the arch to the crown cylinder and pipe as before mentioned. The upper hemisphere of said globe
is cast with a small flanch upon its edge which fits
closely over that of the under one covering the joint and
giving it strength to which is added cast brackets or
ears on the inner side or edge of the bottom section
of said globe by which means the two sections are drawn
and riveted firmly together.

The base of the crown cylinder fits upon a
corresponding necking or flanch around the opening on
the top of the globe in which situation it is held and the
joint concealed by an ornamental cast iron collar for-
ming a hoop for the base of the crown cylinder and the
flanch of the globe. It then turns nearly a right angle out-
ward and forms a spherical rim or collar about two inches wide
and ten in diameter fitted to and encircling the upper
section of the globe said centre crown cylinder forms the cen-
tre flue of the stove and also the feeding orifice through which
the fuel is introduced. The under hemisphere of the globe
is elongated about four inches below the regular curve of
the globe in form of the lower section of a balloon for the
purpose of aiding the descent of the ashes and accommo-
dation of the grate &c. The opening is about six inches in
diameter and precisely corresponds with the top or centre
cylinder which is about one foot high and resting on the
[illegible] round hearth with a suitable moulding encircling its
base from which extends a flanch about one half inch wide
perforated with ventilating holes about one and a quarter
inch in diameter which is designed to admit atmosphere
necessary to supply combustion. Directly over this perfo-
rated rim or flanch is placed a corresponding cast iron
moveable rim with the same number of perforations equi-
distant and of similar dimensions. The office of this
rim which I call the ventilator is to control the com-

8006X bustion of the fuel in the Stove which is effected by giv-
ing it a slight circular movement to the right or left
by which the ventilating holes are thrown open partially
or entirely closed. Which is designed to sufficiently
control the draught of the Stove and regulate its temper-
ature of the heat. The ash pan which is under the
hearth is about _ inches wide by fourteen in length to be drawn
out endwise it is enclosed in a sheet or cast Iron case fitted
snugly to the pan open only on the side from which
the pan is drawn. this case may be cast entire with the
hearth or separately or made of sheet Iron or tin and
its upper edges rivetted to the bottom or under side of
the hearth which is about six inches from the floor sup-
ported on feet of ordinary construction.

The horizontal pipe which passes from the crown
cylinder is flattened or eliptical horizontally so as near-
ly to correspond in width with the diameter of the crown
cylinder. In the bottom of this pipe is fitted a horizontal
damper made to slide inward and close the draught
of the crown cylinder when necessary in which case it passes
wholly through the pipes into the arch ending in the crown
cylinder above said damper by which it is much diminished
and the combustion proportionally reduced. I have varied
the form and arrangement of the arch or flues of said
Stove by passing it horizontally around the globe forming a
circular platform in which the draught passes from the
globe ascending through columns into an arch to the
pipe by which the structure of the stove is more elevated
and more heat discharged immediately in consequence of
an increased surface. I have in this case dispensed
with the side column and have varied the form of the
hearth in the style of a fashionable centre table bottom
I have varied the form of my grates to accommodate the different sizes of my stoves although I think either
form may answer both purposes. The Rack and pinion
grate is constructed as follows. It is made of cast iron
of a circular form about eight inches in diameter in form
of a carriage wheel with ... the rim omitted. The centre
or hub is about one inch thick but not elevated or projecting
above the spokes or radiating bars of the grate which
are deepest in the centre but grow thinner and wider
as they approach the extremity. This grate is placed loose-
ly in a horizontal position in the bottom section of the globe
and to its centre is firmly secured a rack about one
foot in length, quarter of an inch thick and two inches
wide with a slot in its centre nearly its whole length
about three quarters of an inch wide with cogs on one
side of proper dimensions to work in a pinion which
passes horizontally through the centre column and said
rack and by means of a crank-handle on the outer
end of the rack and grate is raised up and down
slightly or the grate may be raised into the centre of the
globe by the vibrating or a slight movement the ashes only
are discharged and in the latter movement when the pinion is
turned several times around the coal is precipitated into
the ash pan at pleasure. The bottom of the rack may be
enclosed in a sheet iron case to secure the cog work from
being clogged with the coal when the centre column is small.
Instead of the rack a straight stem is cast on the grate cen-
trally about eight inches long the bottom end of which fits
loosely in the end of a horizontal lever suspended through
one side of the centre cylinder by moving this lever horizon-
tally the ashes are shaken out perfectly and by working
the said lever perpendicularly the grate is elevated in
the stove where it is large and consequently allows the
coal to fall around its sides into the ash pan. This open tion is only necessary when there is an accumulation
of cinders or slate in the stove.
The mode of operation or manner of filling and
managing said stove is as follows. The urn being remov-
ed a sheet iron funnel which is furnished with a stove
is inserted into the top of the crown cylinder through which
the coal is thrown from the scuttle into the large globe a
suitable quantity of ignited charcoal or light wood may
first be introduced or the hard coal may first be put in and
the kindling put upon the top by making a small opening
in the centre of the coal and when the kindling is well
ignited put small hard coal upon the top and replace
the urn with a common draught the whole mass will
become thoroughly ignited. The same process may be
observed with success in kindling when there remains
a considerable quantity of extinguished coal in the stove
which may frequently occur in the running. Care
should be taken to keep the ashes well shaken out to prevent
the fire from clogging, and when burning too highly the
ventilator may be closed and the centre damper shut as
before mentioned by which means the fire may be perfect-
ly controlled. The ashes and cinders being discharged as
above described.

The improvements claimed in my invention
are as follows viz. First I claim the style, general arrange-
ment and fashion of the above described Radiator or
Globe Stove believing the peculiar advantages of said arrange-
ments in the generating and equal diffusion of heat
exclusively confined to the globe or spherical form as a
reservoir of fuel for the following reasons viz. It is the only
form from which heat can be equally radiated and conse-
quently it has the peculiar advantage of imparting one
half of its heat downwards warming the floor and lowregion of atmosphere which cannot be effected by the angular or cylindrical stove.

Secondly I claim the spherical or hollow globe, or inverted hollow cone for the bottom section in particular as a reservoir of fuel and radiator of heat, in combination with the vibrating and hoisting grate as before specified together with the said centre hollow column which prevents the escape of ashes into the room in its descent from the globe to the ash pan.

Third and lastly. I claim as my improvement separately and as a part the rack or pinion or vibrating and hoisting grate as before specified.

In witness whereof I have hereunto set my hand this eleventh day of December 1833.

Walter Hunt L.S.

Witnesses.
M. A. Loucks
R. C. Wheeler

Drawing (2552 words)